United States Patent [19]
Caraballo

[11] Patent Number: 5,988,740
[45] Date of Patent: Nov. 23, 1999

[54] BICYCLE SEAT

[76] Inventor: Abelardo Caraballo, 3381 SW. 130 Ave., Miami, Fla. 33175

[21] Appl. No.: 09/187,496
[22] Filed: Nov. 6, 1998
[51] Int. Cl.$^6$ ....................................................... B62J 1/00
[52] U.S. Cl. ........................................ 297/201; 297/195.1
[58] Field of Search ................................ 297/195.1, 201, 297/195–12

[56] References Cited

U.S. PATENT DOCUMENTS

| | | |
|---|---|---|
| 531,333 | 12/1894 | Rogers . |
| 572,062 | 11/1896 | Peck . |
| 603,734 | 5/1898 | Peck . |
| 4,089,559 | 5/1978 | Prange et al. . |
| 4,541,668 | 9/1985 | Rouw . |
| 5,167,435 | 12/1992 | Aldi . |

FOREIGN PATENT DOCUMENTS 3717  2/1896  United Kingdom .

Primary Examiner—Milton Nelson, Jr.
Attorney, Agent, or Firm—J. Sanchelima

[57] ABSTRACT

A seat assembly that includes two symmetrical elongated seat sections having each an upperside, an underside with two ends. One of the ends of each of the seat sections are pivotally mounted to a pivoting axle that is transversally disposed. The seat sections are adjacent to each other. A reciprocating mechanism is mounted to the seat assembly at a distance from the underside and causes the sections to move in reciprocal opposite directions. The projection of a user's spine is substantially aligned with pivoting axle. When a user applies his/her weight on one of the pedals, some of this weight is exerted on the distal end which is turn causes the other section to lift the other leg, thus alleviating a user's fatigue.

3 Claims, 2 Drawing Sheets

BICYCLE SEAT

BACKGROUND OF THE INVENTION

1. Field of the Invention

The present invention relates to a bicycle seat with two symmetrical halves that reciprocally pivot about a common axle.

2. Description of the Related Art

Applicant believes that the closest reference corresponds to U.S. Pat. No. 531,333 issued to Rogers in 1894 for bicycle saddle. However, it differs from the present invention because it rocks back and forth along the user's legs but not reciprocally in response to the position of a user's legs. Therefore, the disclosure does not suggest a device that helps a user lift one leg when applying force (and weight) with the other one.

Other patents describing the closest subject matter provide for a number of more or less complicated features that fail to solve the problem in an efficient and economical way. None of these patents suggest the novel features of the present invention.

SUMMARY OF THE INVENTION

One of the main objects of the present invention is to provide a bicycle seat that permits the movement of the legs while maintaining the buttocks area the spine substantially stationary.

It is another object of this invention to provide a bicycle seat that is ergonomically designed to minimize the user's pedaling fatigue.

It is still another object of the present invention to provide a bicycle seat that helps a user lift one of his/her legs when applying his/her weight through the other leg to the pedal.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
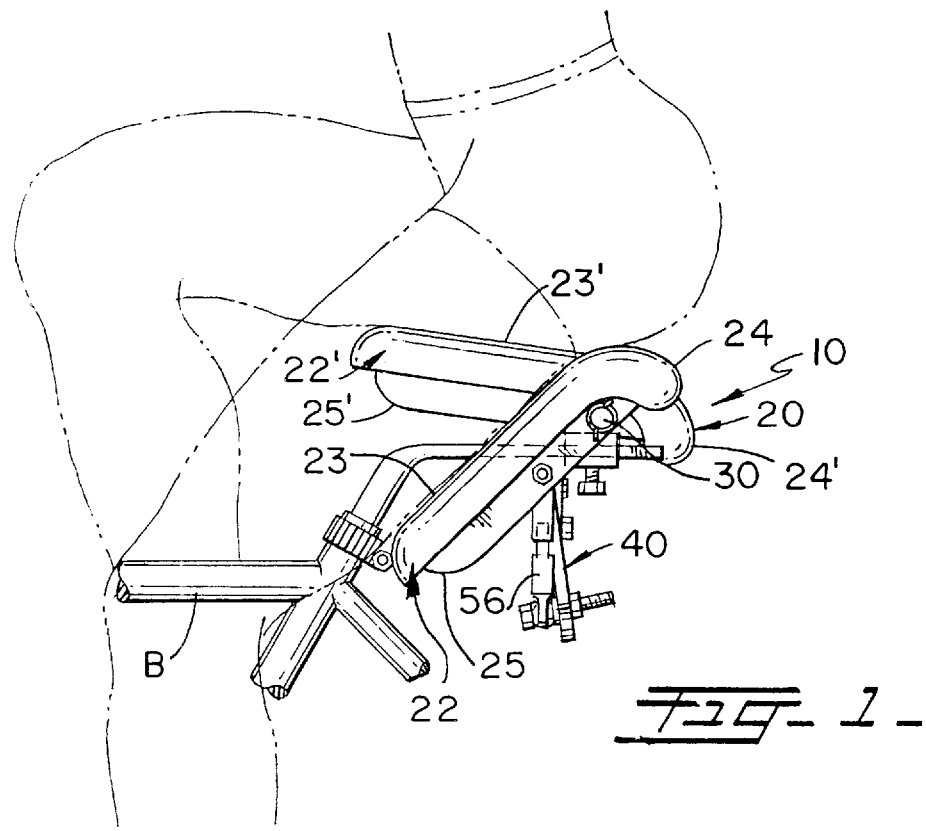
FIG. 1 represents a side elevational view of the present invention.
Figure 2:
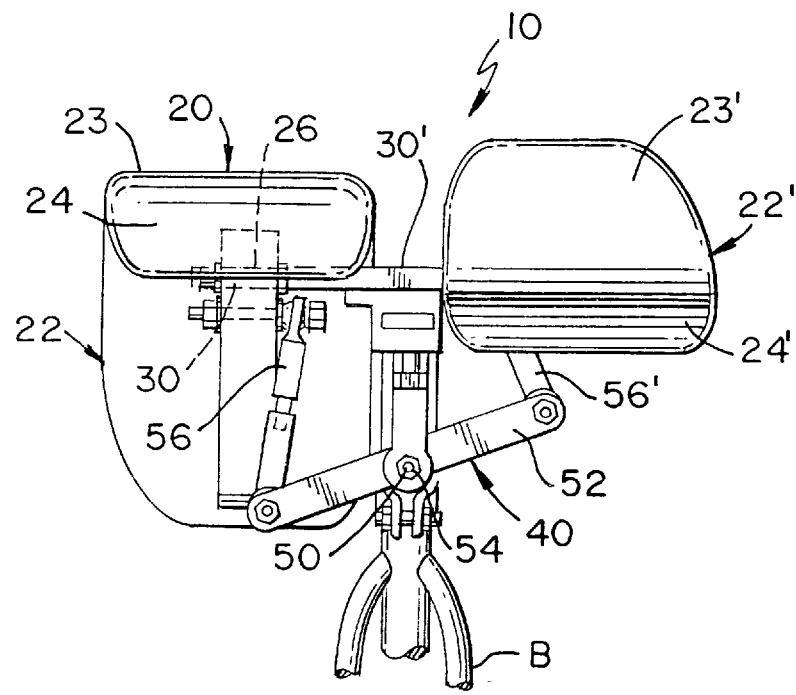
FIG. 2 shows a rear elevational view of the bicycle seat.

Referring now to the drawings, where the present invention is generally referred to with numeral 10, it can be observed that it basically includes seat assembly 20 with two symmetrical seat sections 22 and 22' and reciprocating mechanism 40 that causes their reciprocal movements about a pivot axle substantially in projected alignment with the user's spine.

Seat assembly 20 includes seat sections 22 and 22' that have a substantially flat, and preferably cushioned upper surfaces 23 and 23'. Sections 22 and 22' extend longitudinally a predetermined distance to give a user an extended resting area, when compared to other conventional bicycle seats. The rear end of sections 22 and 22' include round terminations 24 and 24' with ergonomic characteristics to avoid a sharp edge in contact with the user's buttocks or any forward force on the user (as it would be the case with a flat seat section). With reciprocating mechanism 40, a user will be able to apply his/her weight on one of the pedals with one leg and thus apply force to section 22 while section 22' reciprocates and help lifting the other leg thus relieving a user, at least partially, from pulling his/her other leg up. This partial help, in extended trips, is significant.

Figure 3:
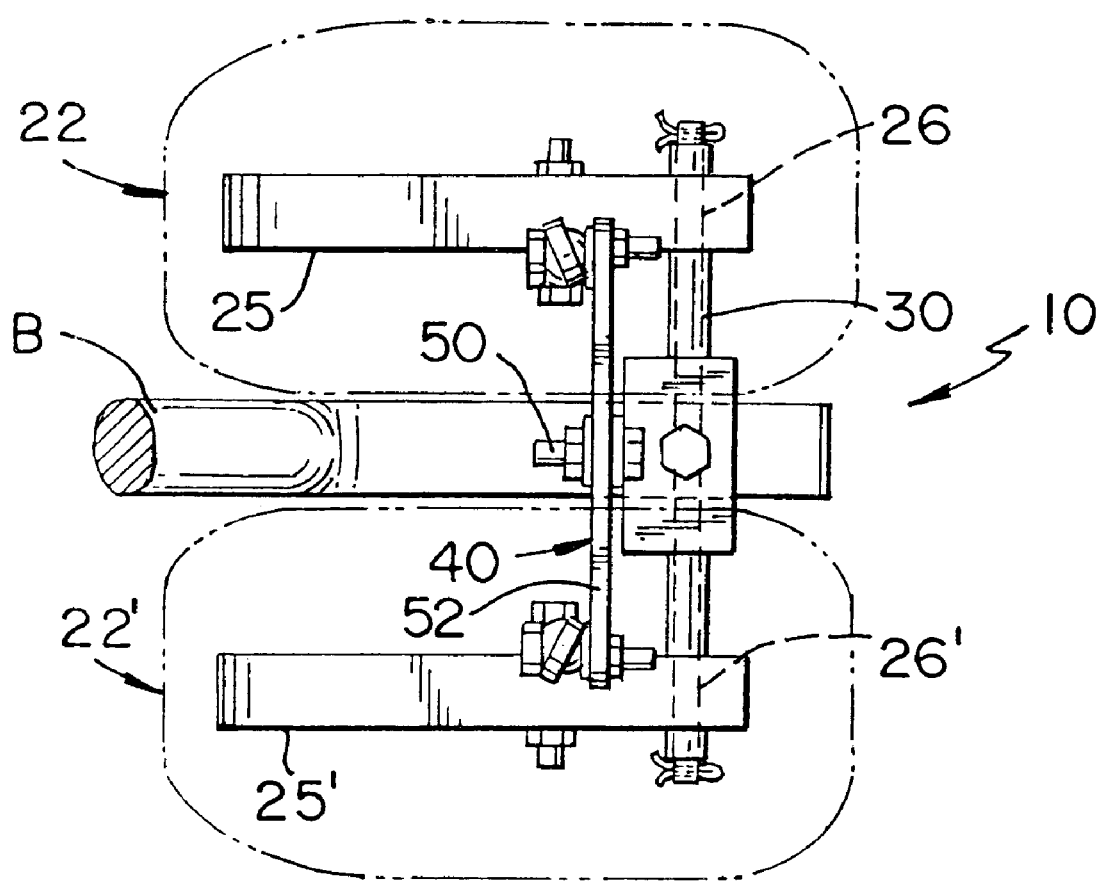
FIG. 3 illustrates a bottom view of the bicycle seat shown in the previous figures.

To accomplish the reciprocating movement mentioned above, the applicant has selected a transversal pivoting axle 30 below the rear ends of sections 22 and 22'. Pivoting axle 30 is positioned substantially in projection below the user's spine to avoid fatigue, and extends transversally across the bicycle's plane. Spacer member 30' covers axle 30. Rib members 25 and 25' extend substantially the entire length of sections 22 and 22' and include through openings 26 and 26' towards the rear. Axle 30 passes through openings 26 and 26', as seen in FIG. 3.

A longitudinally disposed axle or pin 50 is mounted to the body of bicycle B below seat assembly 20. Arm member 52 includes central opening 54 through which axle 50 is passed permitting arm member 52 to pivot about it. Linkage members 56 and 56' pivotally connect the ends of arm member 52 with the underside of sections 22 and 22' at points on rib members 25 and 25' spaced apart from axle 30. In this manner, if section 22 is lowered than section 22' is lifted and the movement continues to reciprocate.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A bicycle seat, comprising:

A. a seat assembly including two symmetrical elongated seat sections having each an upperside, and an underside with first and second ends, and further including a pivoting axle below said underside, said first ends of each of said seat sections being pivotally mounted to said pivoting axle, and said seat sections being adjacent to each other; and B. reciprocating means mounted to said seat assembly at a distance front said underside to cause said sections to move in reciprocal opposite directions so that a user's spine is substantially in projected alignment with said pivoting axle and a user's leg is lifted when the other leg is lowered and said reciprocating means includes a longitudinally disposed axle and an arm, wherein said longitudinally disposed axle extends thru a central portion of said arm, and said central portion is pivotally mounted to said longitudinally disposed axle, and said arm having third and fourth ends, said reciprocating means further includes first and second linkage members pivotally connecting to the undersides of said seat sections and to said third and fourth ends, respectively.

2. The bicycle seat set forth in claim 1 wherein said seat sections include each an elongated rib mounted to the undersides of said seat sections to which said first and second linkage members are pivotally connected.

3. The bicycle seat set forth in claim 2 wherein the uppersides on the first ends include rounded terminations.

* * * * *